United States Patent
Travis

(10) Patent No.: US 10,047,536 B2
(45) Date of Patent: Aug. 14, 2018

(54) POOL CLEANING ASSEMBLY

(71) Applicant: William Travis, Canaserga, NY (US)

(72) Inventor: William Travis, Canaserga, NY (US)

( * ) Notice: Subject to any disclaimer, the term of this patent is extended or adjusted under 35 U.S.C. 154(b) by 0 days.

(21) Appl. No.: 15/335,534

(22) Filed: Oct. 27, 2016

(65) Prior Publication Data
US 2018/0119442 A1    May 3, 2018

(51) Int. Cl.
*E04H 4/16*   (2006.01)
*B01D 33/80*  (2006.01)
*B01D 33/01*  (2006.01)

(52) U.S. Cl.
CPC ....... *E04H 4/1609* (2013.01); *B01D 33/0183* (2013.01); *B01D 33/80* (2013.01); *B01D 2201/64* (2013.01)

(58) Field of Classification Search
CPC .. E04H 4/1609; B01D 33/0183; B01D 33/80; B01D 2201/64
USPC .. 210/167.1, 167.16, 167.17, 238, 470, 471; 4/490
See application file for complete search history.

(56) References Cited

U.S. PATENT DOCUMENTS

| | | | |
|---|---|---|---|
| 3,699,700 A | 10/1972 | Kinsell | |
| 4,429,429 A * | 2/1984 | Altschul | E04H 4/1654 134/167 R |
| 4,653,214 A | 3/1987 | Cline | |
| 5,031,277 A | 7/1991 | Coker | |
| 5,139,660 A | 8/1992 | Lourie et al. | |
| 5,915,431 A * | 6/1999 | Doussan | E04H 4/1609 15/1.7 |
| 7,507,332 B2 | 3/2009 | Henkin et al. | |
| D638,183 S | 5/2011 | Rossano et al. | |
| 2014/0217010 A1 | 8/2014 | Fleury | |

* cited by examiner

*Primary Examiner* — Fred Prince

(57) ABSTRACT

A pool cleaning assembly includes a frame is that may be manipulated thereby facilitating the frame to be urged through a pool. A float is coupled to the top lateral member. The float floats in the pool thereby facilitating the frame to be oriented upright in the pool. A pair of wheels is provided. Each of the wheels is rotatably coupled to the frame to roll along a bottom of the pool. A plurality of brushes is provided and each of the brushes is removably coupled to the frame. Each of the brushes is frictionally engages the bottom of the pool when the frame is urged through the pool. Thus, each of the brushes cleans the bottom of the pool. A screen is removably coupled to the frame. The screen capture debris when the frame is urged in the pool thereby facilitating the debris to be removed from the pool.

13 Claims, 6 Drawing Sheets

POOL CLEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cleaning devices and more particularly pertains to a new cleaning device for cleaning and skimming a pool.

BRIEF SUMMARY OF THE INVENTION

An embodiment of the disclosure meets the needs presented above by generally comprising a frame is that may be manipulated thereby facilitating the frame to be urged through a pool. A float is coupled to the top lateral member. The float floats in the pool thereby facilitating the frame to be oriented upright in the pool. A pair of wheels is provided. Each of the wheels is rotatably coupled to the frame to roll along a bottom of the pool. A plurality of brushes is provided and each of the brushes is removably coupled to the frame. Each of the brushes is frictionally engages the bottom of the pool when the frame is urged through the pool. Thus, each of the brushes cleans the bottom of the pool. A screen is removably coupled to the frame. The screen capture debris when the frame is urged in the pool thereby facilitating the debris to be removed from the pool.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
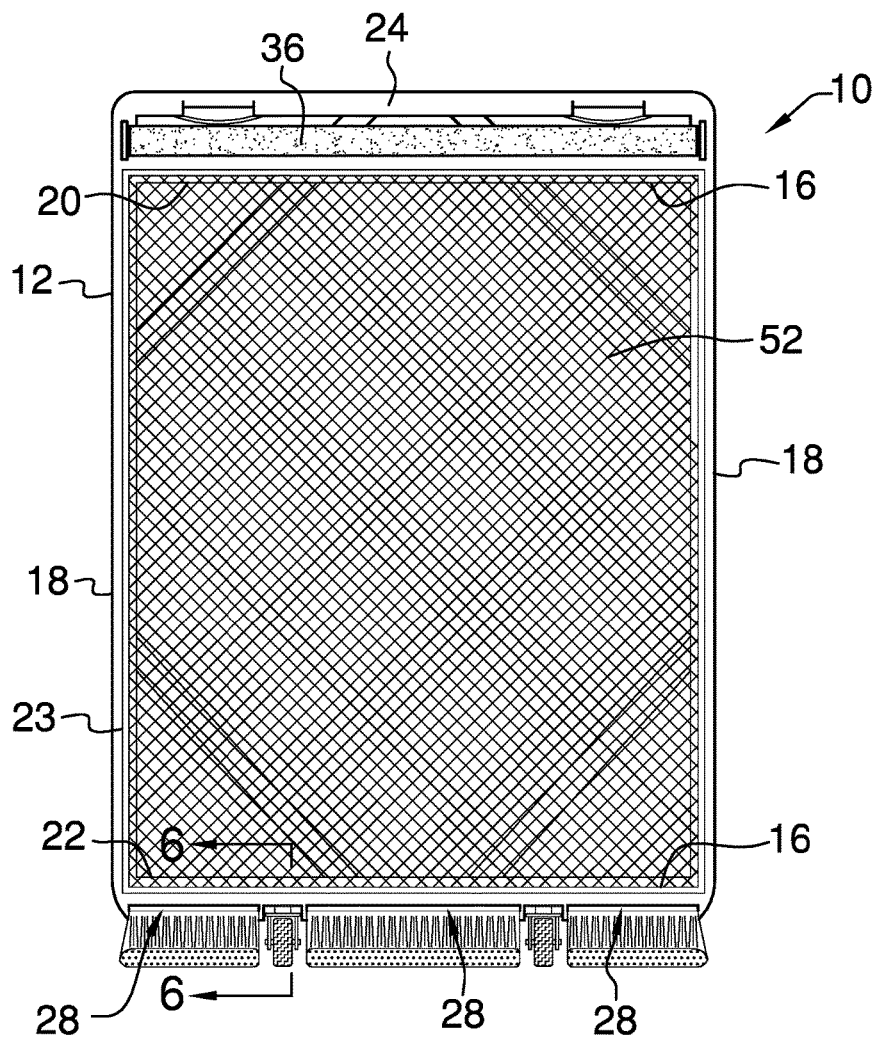
FIG. 1 is a front view of a pool cleaning assembly according to an embodiment of the disclosure.
Figure 2:
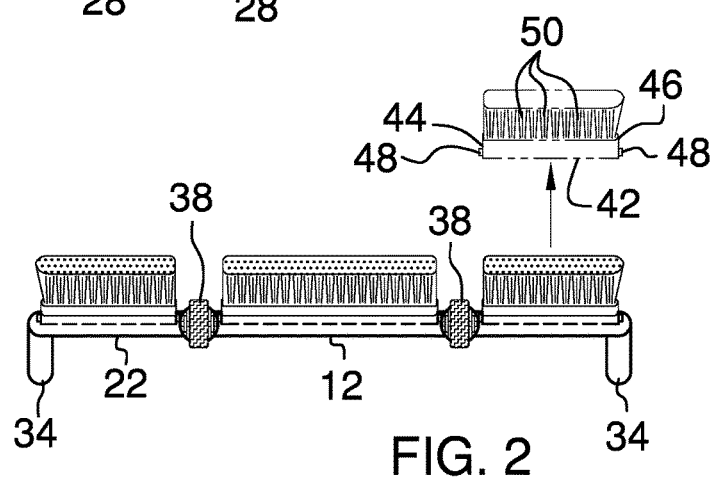
FIG. 2 is a bottom view of an embodiment of the disclosure.
Figure 3:
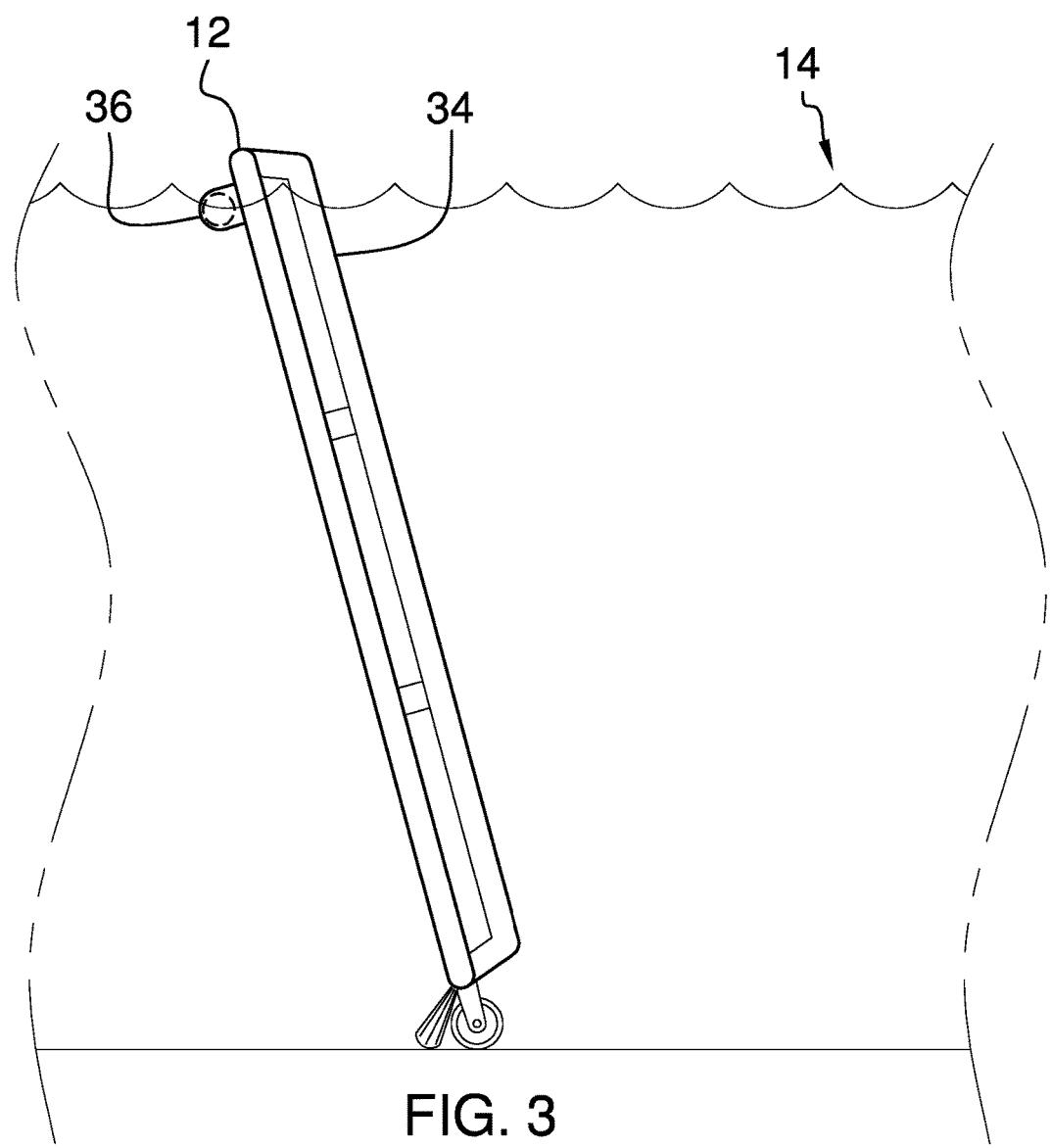
FIG. 3 is a right side view of an embodiment of the disclosure.
Figure 4:
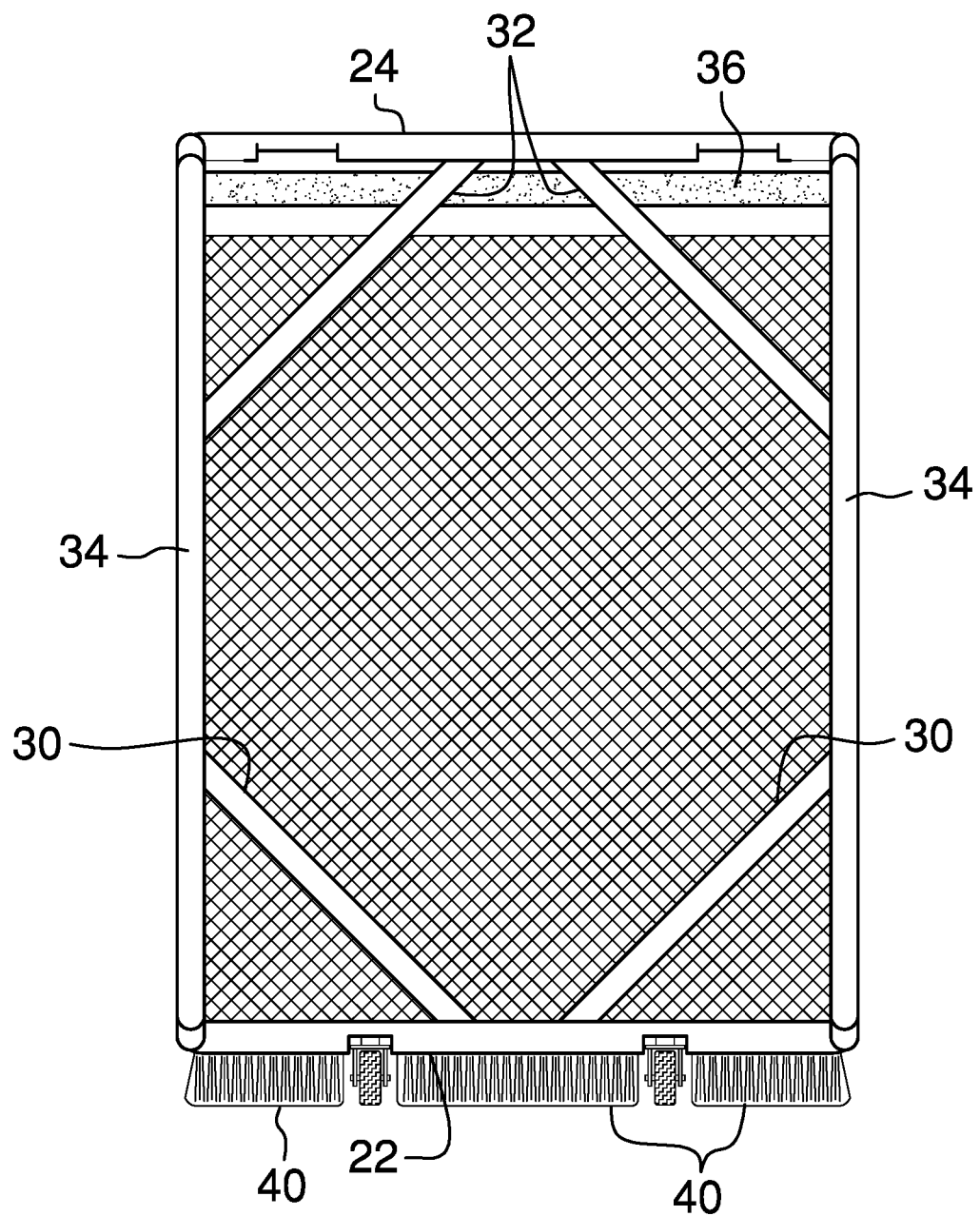
FIG. 4 is a back view of an embodiment of the disclosure.
Figure 5:
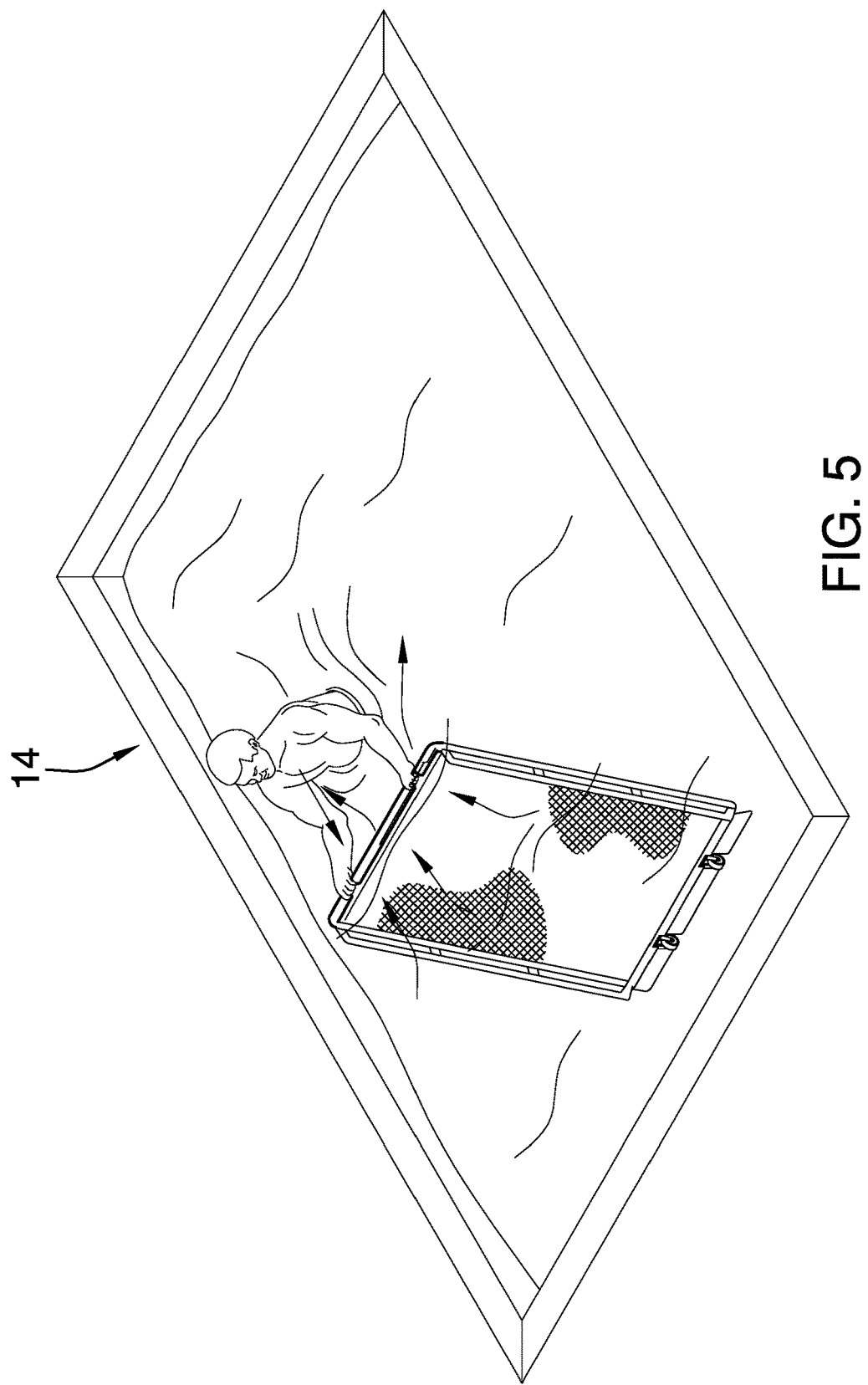
FIG. 5 is a perspective in-use view of an embodiment of the disclosure.
Figure 6:
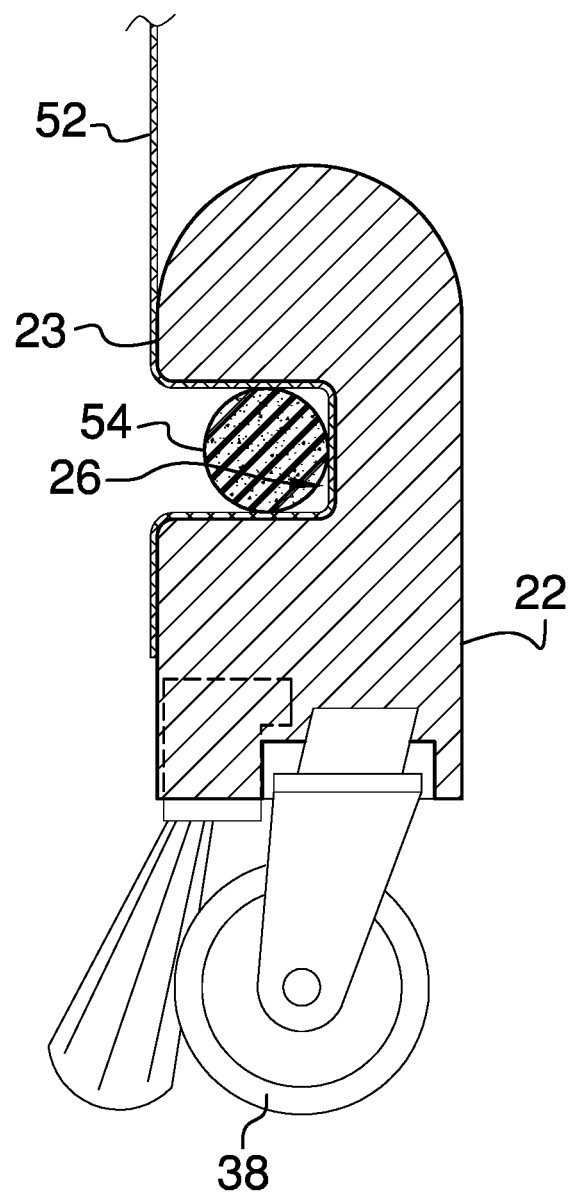
FIG. 6 is a cross sectional view taken along line 6-6 of FIG. 1 of an embodiment of the disclosure.

With reference now to the drawings, and in particular to FIGS. 1 through 7 thereof, a new cleaning device embodying the principles and concepts of an embodiment of the disclosure and generally designated by the reference numeral 10 will be described.

As best illustrated in FIGS. 1 through 7, the pool cleaning assembly 10 generally comprises a frame 12 that may be manipulated. The frame 12 may be urged through a pool 14. The pool 14 may be a swimming pool or the like. The frame 12 has a pair of lateral members 16 and a pair of longitudinal members 18 extending between each of the lateral members 16. The longitudinal members 18 are spaced apart from each other such that the frame 12 has a rectangular shape.

The pair of lateral members 16 includes a top lateral member 20 and a bottom lateral member 22. The frame 12 has a front side 23. The frame 12 includes a handle 24 that is coextensively spaced from the top lateral member 20. Thus, the handle 24 may be gripped.

The front side 23 of the frame 12 has a channel 26 extending therein. The channel 26 extends around an entire perimeter of the frame 12. The bottom lateral member 22 has a plurality of slots 28 extending therein. The slots 28 are spaced apart from each other.

A pair of first supports 30 is provided. Each of the first supports 30 extends between an associated one of the longitudinal members 18 and the bottom lateral member 22. A pair of second supports 32 is provided. Each of the second supports 32 extends between an associated one of the longitudinal members 18 and the top lateral member 20.

A pair of braces 34 is provided. Each of the braces 34 is coupled between the top lateral member 20 and the bottom lateral member 22. Each of the braces 34 is coextensive with an associated one of the longitudinal members 18. Moreover, each of the braces 34 is spaced from the associated longitudinal member 18.

A float 36 is coupled to the top lateral member 20. The float 36 floats in the pool 14 thereby facilitating the frame 12 to be oriented upright in the pool 14. The float 36 is coextensive with the top lateral member 20. The float 36 is positioned on the front side 23 of the frame 12. The float 36 is comprised of a buoyant material.

A pair of wheels 38 is provided. Each of the wheels 38 is rotatably coupled to the frame 12. Each of the wheels 38 rolls along a bottom of the pool 14. Each of the wheels 38 is positioned on the bottom lateral member 22. Moreover, the wheels 38 are spaced apart from each other.

A plurality of brushes 40 is provided. Each of the brushes 40 is removably coupled to the frame 12. Each of the brushes 40 frictionally engages the bottom of the pool 14 when the frame 12 is urged through the pool 14. Thus, each of the brushes 40 cleans the bottom of the pool 14. Each of the brushes 40 is positioned on and extends downwardly from the bottom lateral member 22. The brushes 40 are spaced apart from each other.

Each of the brushes 40 comprises a plate 42 that has a first end 44 and a second end 46. The plate 42 is selectively positioned in a selected one of the slots 28 in the bottom lateral member 22. A pair of tabs 48 is provided. Each of the tabs 48 is coupled to and extends outwardly from an associated one of the first end 44 and the second end 46. Each of the tabs 48 engages the bottom lateral member 22 such that the plate 42 is retained in the selected slot 28.

A plurality of bristles 50 is provided. Each of the bristles 50 is coupled to the plate 42. Each of the bristles 50 frictionally engages the bottom of the pool 14 when the frame 12 is urged along the bottom of the pool 14. Thus, each of the bristles 50 scrubs the bottom of the pool 14.

A screen 52 is removably coupled to the frame 12. The screen 52 captures debris when the frame 12 is urged in the pool 14. Thus, the debris may be removed from the pool 14. The debris may be leaves, insects or other debris commonly found in a pool 14. The screen 52 is positioned on the front side 23 of the frame 12 and the screen 52 abuts each of the supports.

A gasket 54 is provided. The gasket 54 is continuous such that the gasket 54 forms a rectangle. The gasket 54 is compressed into the channel 26 in the frame 12 when the screen 52 is positioned on the frame 12. Thus, the gasket 54 removably retains the screen 52 on the frame 12.

Figure 7:
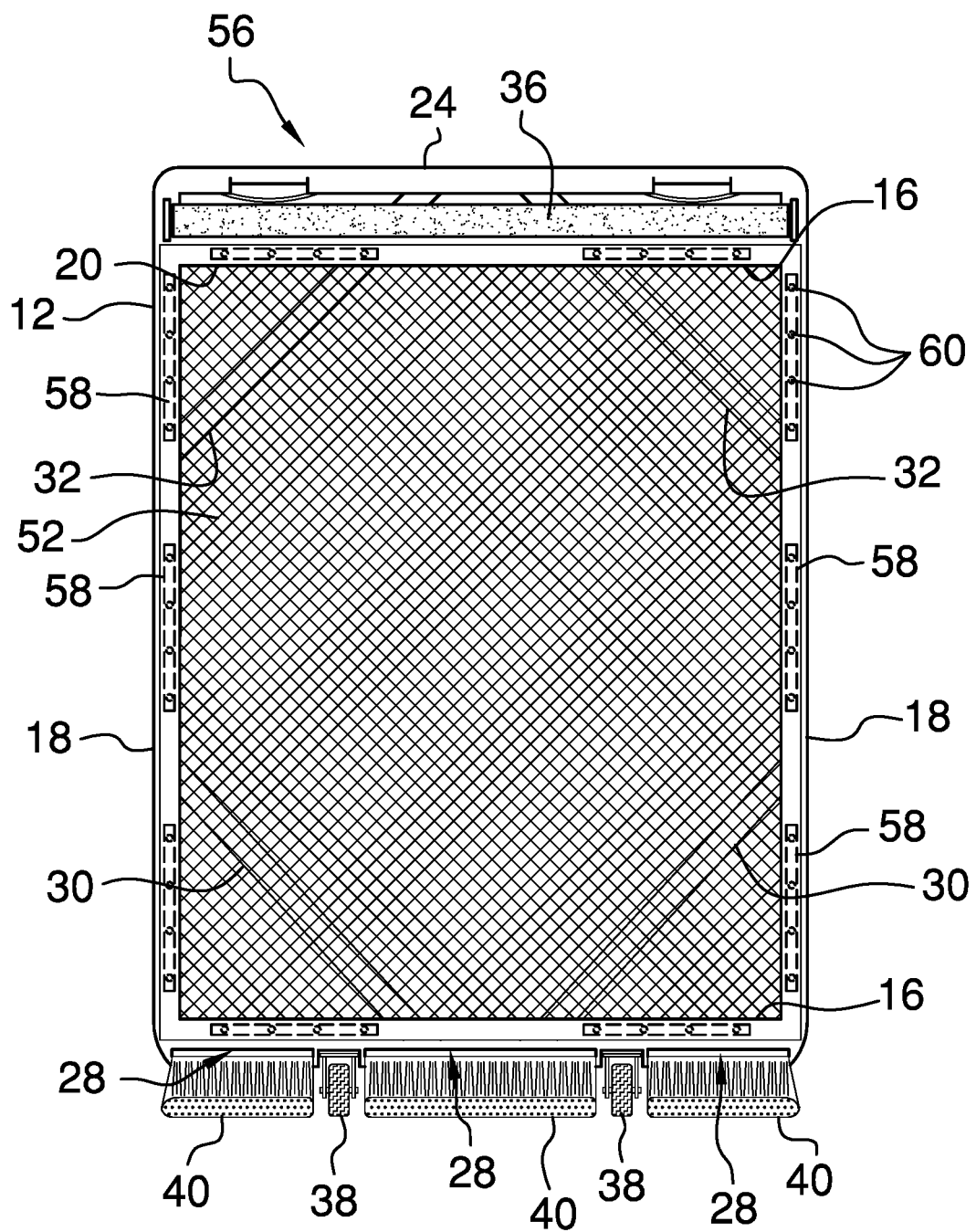
FIG. 7 is a front view of an alternative embodiment of the disclosure.

In an alternative embodiment 56 as shown in FIG. 7, a plurality of fasteners 58 may be provided. Each of the fasteners 58 may be coupled to the front side 23 of the frame 12. Moreover, the fasteners 58 may be distributed around the frame 12. The fasteners 58 may removably engage the screen 52 to retain the screen 52 on the frame 12. Each of the fasteners 58 may comprise a hook and loop fastener or the like. A plurality of rivets 60 may each extend through the fasteners 58 and engage the frame 12. Thus, each of the fasteners 58 may be retained on the frame 12.

In use, the frame 12 is positioned in the pool 14 has the wheels 38 abut the bottom of the pool 14. The handle 24 is gripped and the frame 12 is urged along the pool 14. Thus, the brushes 40 clean the bottom of the pool 14 and the screen 52 captures debris in the pool 14. The frame 12 is manipulated along an entirety of the pool 14. Thus, the bottom of the pool 14 is cleaned and the debris is removed from the pool 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pool cleaning assembly being configured to be urged through a pool, said assembly comprising:
    a frame being configured to be manipulated thereby facilitating said frame to be urged through a pool, said frame having a pair of lateral members and a pair of longitudinal members extending between each of said lateral members, said longitudinal members being spaced apart from each other such that said frame has a rectangular shape, said pair of lateral members including a top lateral member and a bottom lateral member, said frame having a front side;
    a float being coupled to said top lateral member wherein said float is configured to float in the pool thereby facilitating said frame to be oriented upright in the pool;
    a pair of wheels, each of said wheels being rotatably coupled to said frame wherein each of said wheels is configured to roll along a bottom of the pool;
    a plurality of brushes, each of said brushes being removably coupled to said frame wherein each of said brushes is configured to frictionally engage the bottom of the pool when said frame is urged through the pool thereby facilitating each of said brushes to clean the bottom of the pool; and
    a screen being removably coupled to said frame wherein said screen is configured to capture debris when said frame is urged in the pool thereby facilitating the debris to be removed from the pool.

2. The assembly according to claim 1, wherein said frame includes a handle being coextensively spaced from said top lateral member wherein said handle is configured to be gripped.

3. The assembly according to claim 2, wherein said front side of said frame has a channel extending therein, said channel extending around an entire perimeter of said frame.

4. The assembly according to claim 3, wherein said bottom lateral member having a plurality of slots extending therein, said slots being spaced apart from each other.

5. The assembly according to claim 1, further comprising a pair of first supports, each of said first supports extending between an associated one of said longitudinal members and said bottom lateral member.

6. The assembly according to claim 1, further comprising a pair of second supports, each of said second supports extending between an associated one of said longitudinal members and said top lateral member.

7. The assembly according to claim 1, wherein said float is coextensive with said top lateral member, said float being positioned on said front side of said frame, said float being comprised of a buoyant material.

8. The assembly according to claim 1, wherein each of said brushes is positioned on and extends downwardly from said bottom lateral member, said brushes being spaced apart from each other.

9. The assembly according to claim 8, wherein:
said bottom lateral member has a plurality of slots; and
each of said brushes comprises a plate having a first end and a second end, said plate being selectively positioned in a selected one of said slots in said bottom lateral member.

10. The assembly according to claim 9, further comprising a pair of tabs, each of said tabs being coupled to and extending outwardly from an associated one of said first end and said second end, each of said tabs engaging said bottom lateral member such that said plate is retained in said selected slot.

11. The assembly according to claim 10, further comprising a plurality of bristles, each of said bristles being coupled to said plate, each of said bristles being configured to frictionally engage the bottom of the pool when said frame is urged along the bottom of the pool.

12. The assembly according to claim 3, further comprising a gasket being continuous such that said gasket forms a rectangle, said gasket being compressed into said channel in said frame when said screen is positioned on said frame such that said gasket removably retains said screen on said frame.

13. A pool cleaning assembly being configured to be urged through a pool, said assembly comprising:
a frame being configured to be manipulated thereby facilitating said frame to be urged through a pool, said frame having a pair of lateral members and a pair of longitudinal members extending between each of said lateral members, said longitudinal members being spaced apart from each other such that said frame has a rectangular shape, said pair of lateral members including a top lateral member and a bottom lateral member, said frame having a front side, said frame including a handle being coextensively spaced from said top lateral member wherein said handle is configured to be gripped, said front side of said frame having a channel extending therein, said channel extending around an entire perimeter of said frame, said bottom lateral member having a plurality of slots extending therein, said slots being spaced apart from each other;
a pair of first supports, each of said first supports extending between an associated one of said longitudinal members and said bottom lateral member;
a pair of second supports, each of said second supports extending between an associated one of said longitudinal members and said top lateral member;
a float being coupled to said top lateral member wherein said float is configured to float in the pool thereby facilitating said frame to be oriented upright in the pool, said float being coextensive with said top lateral member, said float being positioned on said front side of said frame, said float being comprised of a buoyant material;
a pair of wheels, each of said wheels being rotatably coupled to said frame wherein each of said wheels is configured to roll along a bottom of the pool, each of said wheels being positioned on said bottom lateral member, said wheels being spaced apart from each other;
a plurality of brushes, each of said brushes being removably coupled to said frame wherein each of said brushes is configured to frictionally engage the bottom of the pool when said frame is urged through the pool thereby facilitating each of said brushes to clean the bottom of the pool, each of said brushes being positioned on and extending downwardly from said bottom lateral member, said brushes being spaced apart from each other, each of said brushes comprising:
a plate having a first end and a second end, said plate being selectively positioned in a selected one of said slots in said bottom lateral member,
a pair of tabs, each of said tabs being coupled to and extending outwardly from an associated one of said first end and said second end, each of said tabs engaging said bottom lateral member such that said plate is retained in said selected slot, and
a plurality of bristles, each of said bristles being coupled to said plate, each of said bristles being configured to frictionally engage the bottom of the pool when said frame is urged along the bottom of the pool;
a screen being removably coupled to said frame wherein said screen is configured to capture debris when said frame is urged in the pool thereby facilitating the debris to be removed from the pool, said screen being positioned on said front side of said frame, said screen abutting each of said supports; and
a gasket being continuous such that said gasket forms a rectangle, said gasket being compressed into said channel in said frame when said screen is positioned on said frame such that said gasket removably retains said screen on said frame.

* * * * *